(12) United States Patent
Lee

(10) Patent No.: US 8,328,159 B2
(45) Date of Patent: Dec. 11, 2012

(54) VACUUM VALVE DEVICE FOR BAG

(76) Inventor: Ti-Tien Lee, Anaheim, CA (US)

( * ) Notice: Subject to any disclaimer, the term of this patent is extended or adjusted under 35 U.S.C. 154(b) by 650 days.

(21) Appl. No.: 12/456,380

(22) Filed: Jun. 15, 2009

(65) Prior Publication Data

US 2009/0256100 A1    Oct. 15, 2009

Related U.S. Application Data

(63) Continuation-in-part of application No. 11/552,557, filed on Oct. 25, 2006, now abandoned.

(51) Int. Cl.
*F16K 51/00* (2006.01)

(52) U.S. Cl. ......... 251/144; 251/149.1; 383/43; 383/44; 383/45; 53/434; 141/65; 206/524.8

(58) Field of Classification Search .................. 251/144, 251/149.1; 383/43, 45; 206/524.8; 141/65; 137/223, 232; 53/434
See application file for complete search history.

(56) References Cited

U.S. PATENT DOCUMENTS

| | | | | |
|---|---|---|---|---|
| 3,780,768 A | * | 12/1973 | Soderstrom | 137/625.48 |
| 3,785,395 A | * | 1/1974 | Andreasson | 137/223 |
| 5,240,112 A | * | 8/1993 | Newburger | 206/524.8 |
| 6,089,251 A | * | 7/2000 | Pestel | 137/234.5 |
| 7,513,481 B2 | * | 4/2009 | Su | 251/82 |
| 2003/0075218 A1 | * | 4/2003 | Lau | 137/223 |
| 2007/0241023 A1 | * | 10/2007 | Ootsubo et al. | 206/524.8 |

FOREIGN PATENT DOCUMENTS

WO    WO2006025080    *    3/2006

* cited by examiner

*Primary Examiner* — John K. Fristoe, Jr.
*Assistant Examiner* — Marina Tietjen
(74) *Attorney, Agent, or Firm* — Raymond Y. Chan; David and Raymond Patent Firm

(57) ABSTRACT

A vacuum valve device is used with a bag and has a base and a clip. The base has a tube, a clipping flange and a valve. The tube mounted through a sheet of the bag and has a central hole and at least one outlet hole. The clipping flange is formed on the tube. The valve is mounted slidably in the tube and selectively seal the at least one outlet hole. The clip is mounted detachably around the tube of the base and cooperates with the clipping flange to hermetically clip the sheet of the bag. The vacuum valve device may be reused, is economical and marketable.

13 Claims, 14 Drawing Sheets

VACUUM VALVE DEVICE FOR BAG

CROSS REFERENCE OF RELATED APPLICATION

This is a Continuation-In-Part application of a non-provisional application having an application Ser. No. 11/552,557 and a filing date of Oct. 25, 2006 now abandoned.

BACKGROUND OF THE PRESENT INVENTION

1. Field of Invention

The present invention relates to a valve device, and more particularly to a vacuum valve device for a bag and that allows the bag to be deflated and sealed so items in the bag are vacuum-packed.

2. Description of Related Arts

Plastic bags are non-permeable to water and gas and are used widely to package and preserve items for example quilts, carpets, clothes, and foods such as fish, meat and vegetables. A conventional plastic bag has an opening and a seal mounted on the opening. After items or foods are packaged in the plastic bag, people may squeeze inside air out of the plastic bag and then close the seal to vacuum-package the items or foods. However, manually squeezing the bag cannot entirely discharge inside air out of the plastic bag. Remaining air inside the plastic bag will oxidize the items and decompose the foods.

To solve the problem that the air remains in the plastic bag, an improved plastic bag with an un-detachable vacuum valve is developed. The vacuum valve is melted and mounted securely on the plastic bag and may be connected to a vacuum pump. The vacuum pump may pump inside air thoroughly out of the plastic bag through the valve so the plastic bag may finely package and preserve items or tools.

However, the plastic bag with the valve has a high cost. Furthermore, the plastic bag has a short life-span and needs to be discarded soon due to the plastic bag is damaged easily or smells after packaging foods such as meat and fishes. People are unwilling to buy such plastic bags with a high cost and a shots life-span. Therefore, the plastic bag with the un-detachable valve is unmarketable.

To overcome the shortcomings, the present invention provides a vacuum valve device for a bag to mitigate or obviate the aforementioned problems. The vacuum valve is able to detachably coupling with most of the bags for storing food, clothes, and others, so that the vacuum valve is able to be detached from a worn out bag to incorporate with another bag, so as to economically re-use the vacuum valve.

In order to detachably couple a detachable vacuum valve for vacuuming the air in a non-permeable bag, the user either has to make a hole through the sheet of bag that approximately matching the air outlet of the vacuum valve, so that the air is able to flow to the air outlet via a valve tube through the hole on the bag.

However, the hole is normally not accurate enough to match an opening of the air outlet, so that the bag may not be able to completely seal the cavity through the vacuum valve, so as to reduce the ability of isolating the object stored in the bag from the air or the likes. Therefore, the hole may be too small for the valve tube passing through, or too big that the vacuum valve is unable to completely seal the bag in an air-tight manner.

How to detachably mount the detachably vacuum valve to the bag is another major issues to seal and tight the cavity of the bag through the hole thereon. Accordingly, when the detachably vacuum valve is mounted at the bag, bag may also be twisted while making a hole on the bag or while coupling the valve with bag via a non-fixed hole on the bag. In order to tightly couple the detachably vacuum valve, the detachably vacuum valve must be large enough for being tightly held by two hands of the user. Therefore, it is relatively easier to apply a rotational force to tightly seal the vacuum valve. It increases the volume of the vacuum valve, and reduces the storage space within the storing bag.

SUMMARY OF THE PRESENT INVENTION

A main object of the present invention is to provide a vacuum valve device, which is capable of detachably coupling with an air non-permeable bag for vacuuming air within the bag. Therefore, the vacuum valve device of the present invention is re-useable to incorporate with any existing sealing bag.

Another object of the present invention is to provide a vacuum valve kit, which comprises a hole maker and a pump for incorporating with the vacuum valve device to vacuum the air within the bag.

Another object of the present invention is to provide a vacuum valve kit, wherein the hole maker is provided for making a through hole on the bag, so that the through hole is matching the size and shape of the valve shaft, so as to conveniently and completely seal the bag when the vacuum valve device is detachably mounted at the bag.

Another object of the present invention is to provide a vacuum valve kit, wherein the hole maker is able to be used as an auxiliary tool for easily rotating the vacuum valve to sealably couple with the bag.

Another object of the present invention is to provide a vacuum valve device, which has a minimum size for increasing the storing space within the bag.

Another object of the invention is to provide a vacuum valve device for a bag that allows the bag to be deflated and sealed so items in the bag are vacuum-packed.

A vacuum valve device in accordance with the present invention is used with a bag and comprises a base and a clip. The base has a tube, a clipping flange and a valve. The tube amounted through a sheet of the bag and has a central hole and at least one outlet hole. The clipping flange is formed on the tube. The valve is mounted slidably in the tube and selectively seal the at least one outlet hole. The clip is mounted detachably around the tube of the base and cooperates with the clipping flange to hermetically clip the sheet of the bag.

Accordingly, in order to accomplish the above objects, the present invention provide a vacuum valve device, which comprises a valve body and a valve retainer for detachably and rotatably coupling with the valve body to sandwich a sheet of the bag therebetween.

Other objectives, advantages and novel features of the invention will become more apparent from the following detailed description when taken in conjunction with the accompanying drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
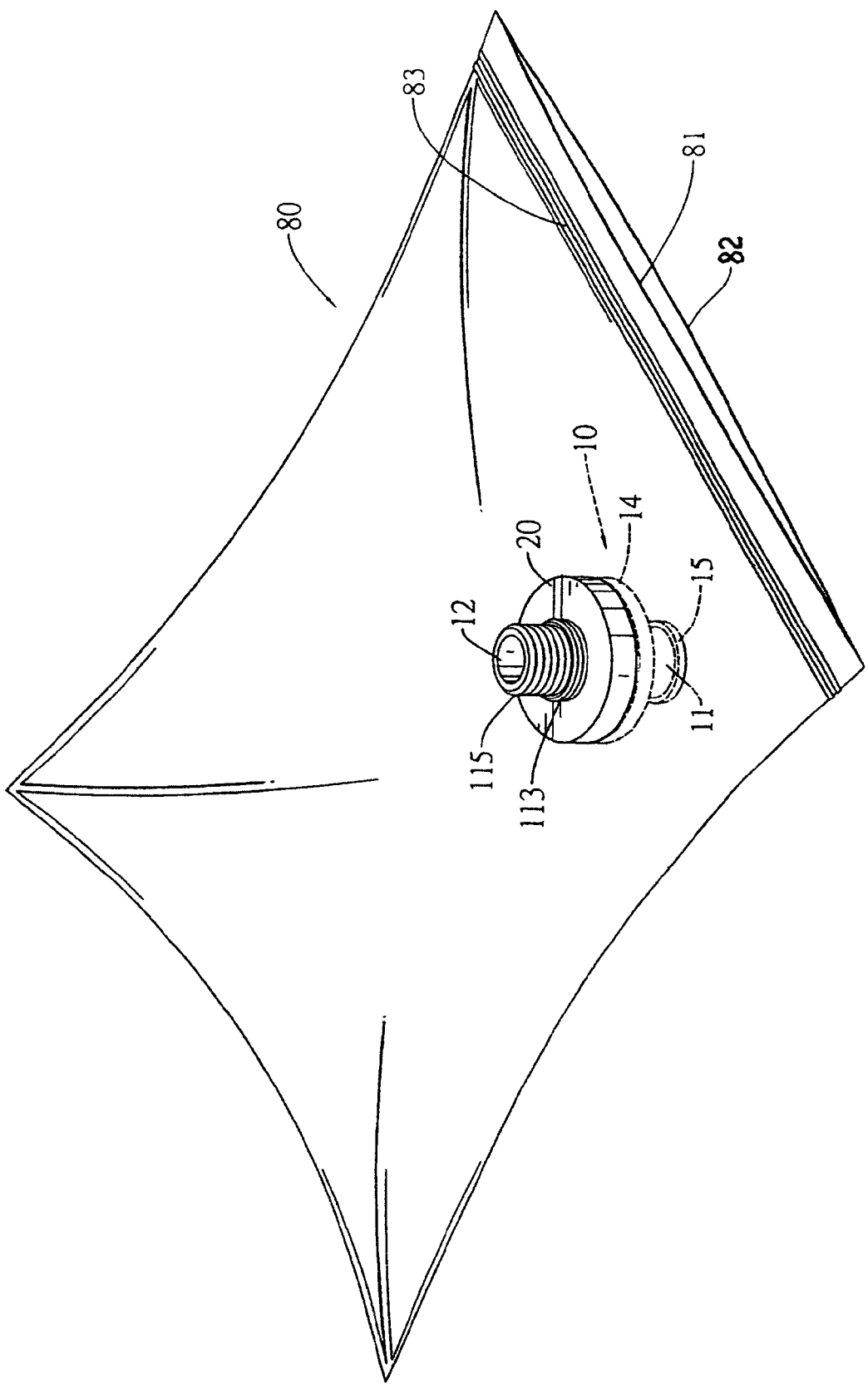
FIG. 1 is a perspective view of a vacuum valve device in accordance with the present invention mounted on a bag.
Figure 2:
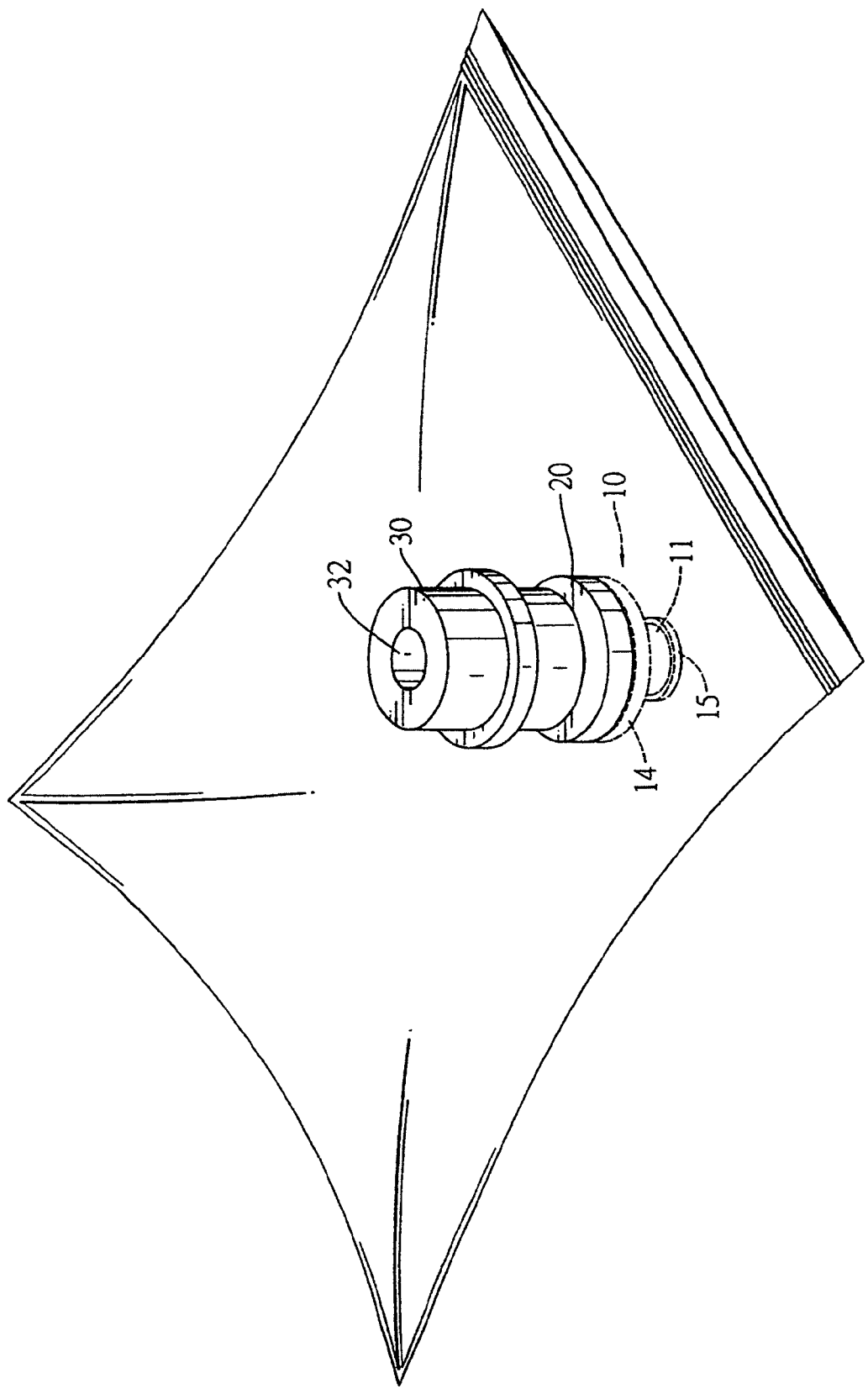
FIG. 2 is a perspective view of the vacuum valve device in FIG. 1 with an adapter sleeve.

With reference to FIGS. 1 and 2, a vacuum valve device in accordance with the present invention is used with and mounted detachably on a bag (80) that is un-permeable to water or gas and may be made of plastic. The bag (80) has a cavity, an opening, two sheets (81, 82) and a seal (83). The cavity is defined in the bag (80). The seal (83) is mounted on the opening and selectively seals the opening.

The vacuum valve device is mounted on one sheet (81) of the bag (80) and has a base (10)), a clip (20) and all adapter sleeve (30).

Figure 3:
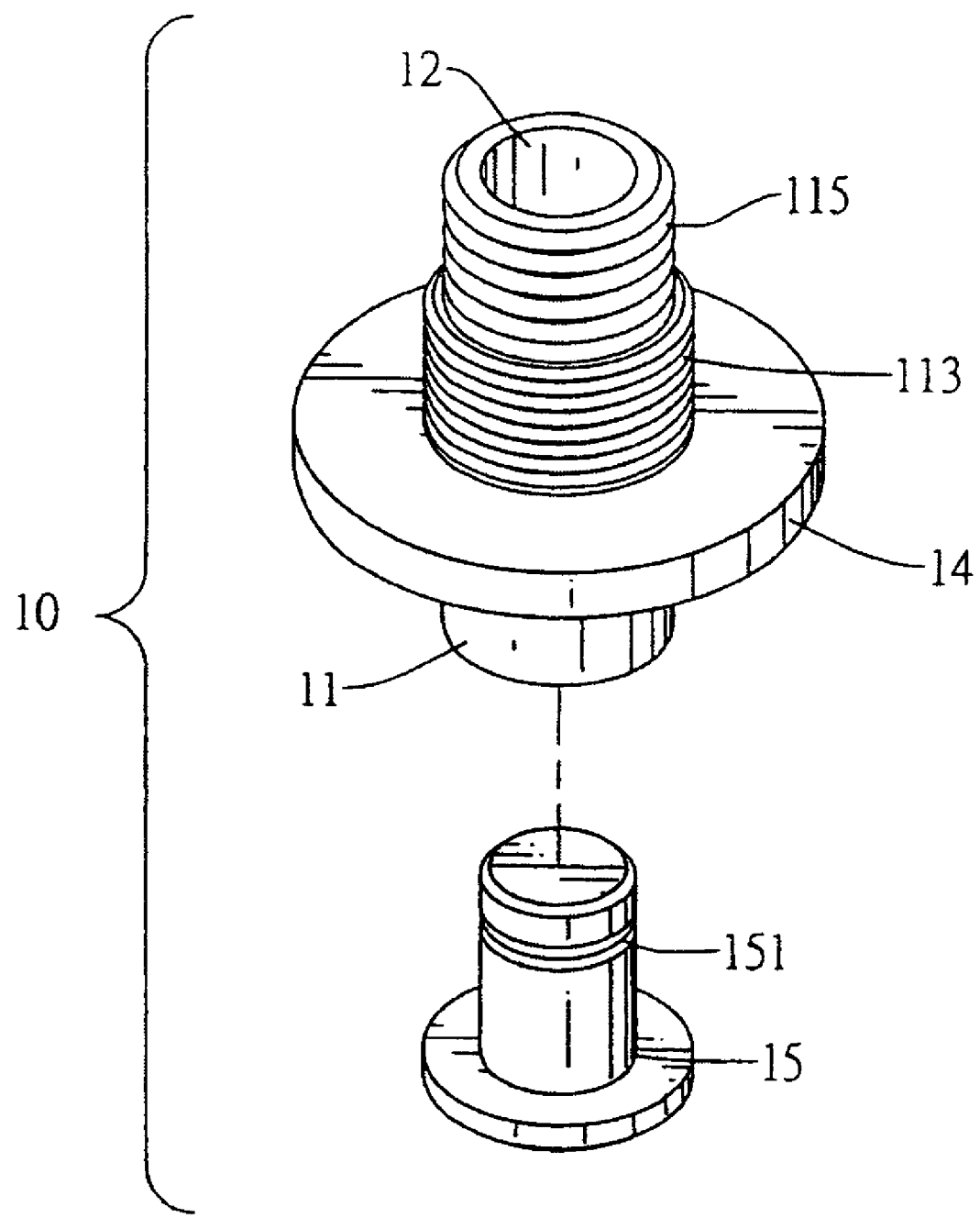
FIG. 3 is an exploded perspective view of the base of the vacuum valve device in FIG. 2.
Figure 4:
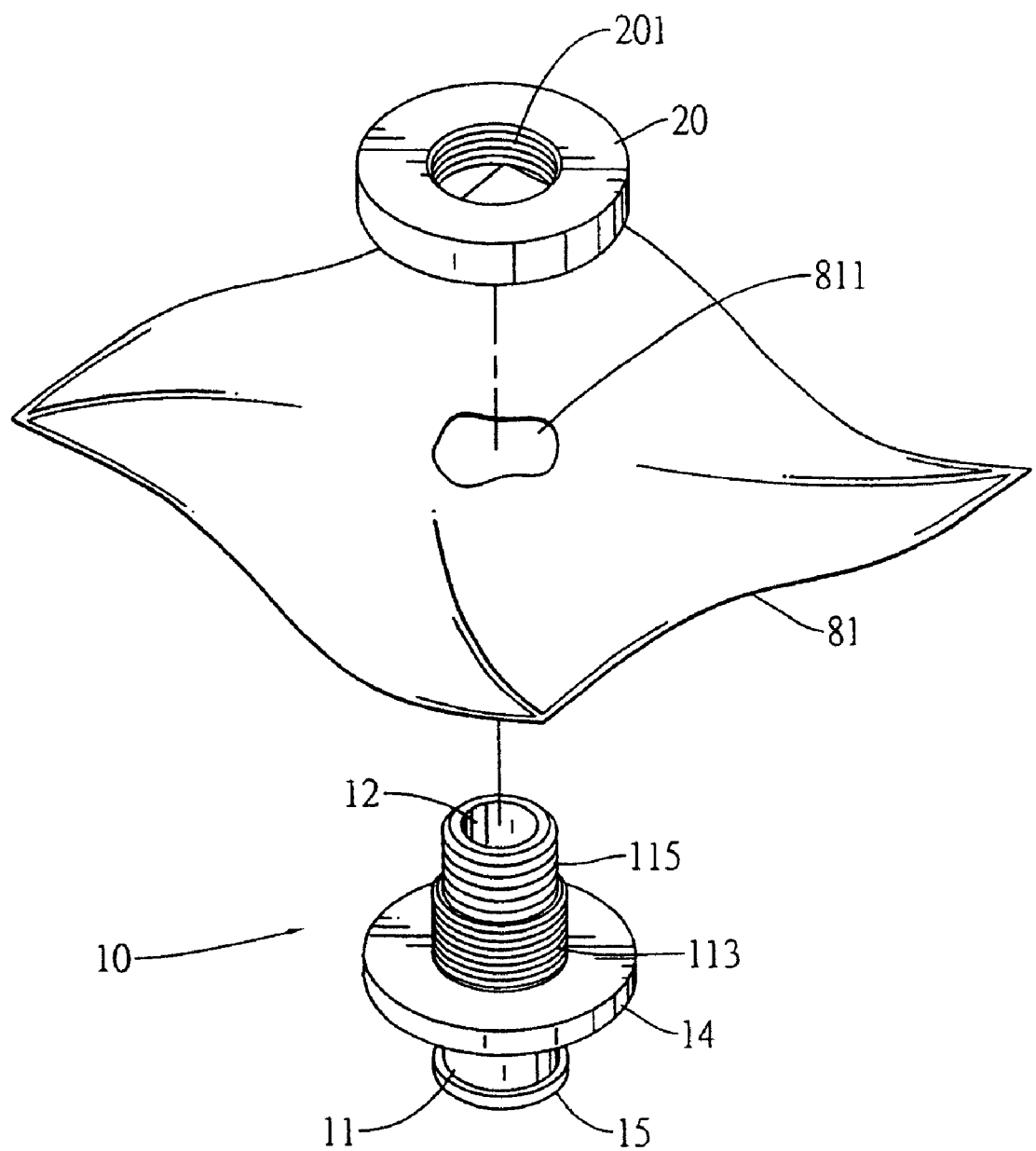
FIG. 4 is a partially exploded perspective view of the vacuum valve device in FIG. 2 with one sheet of the bag.

With reference to FIGS. 3 and 4, the base (10) has a tube (11) and a valve shaft (15).

Figure 5:
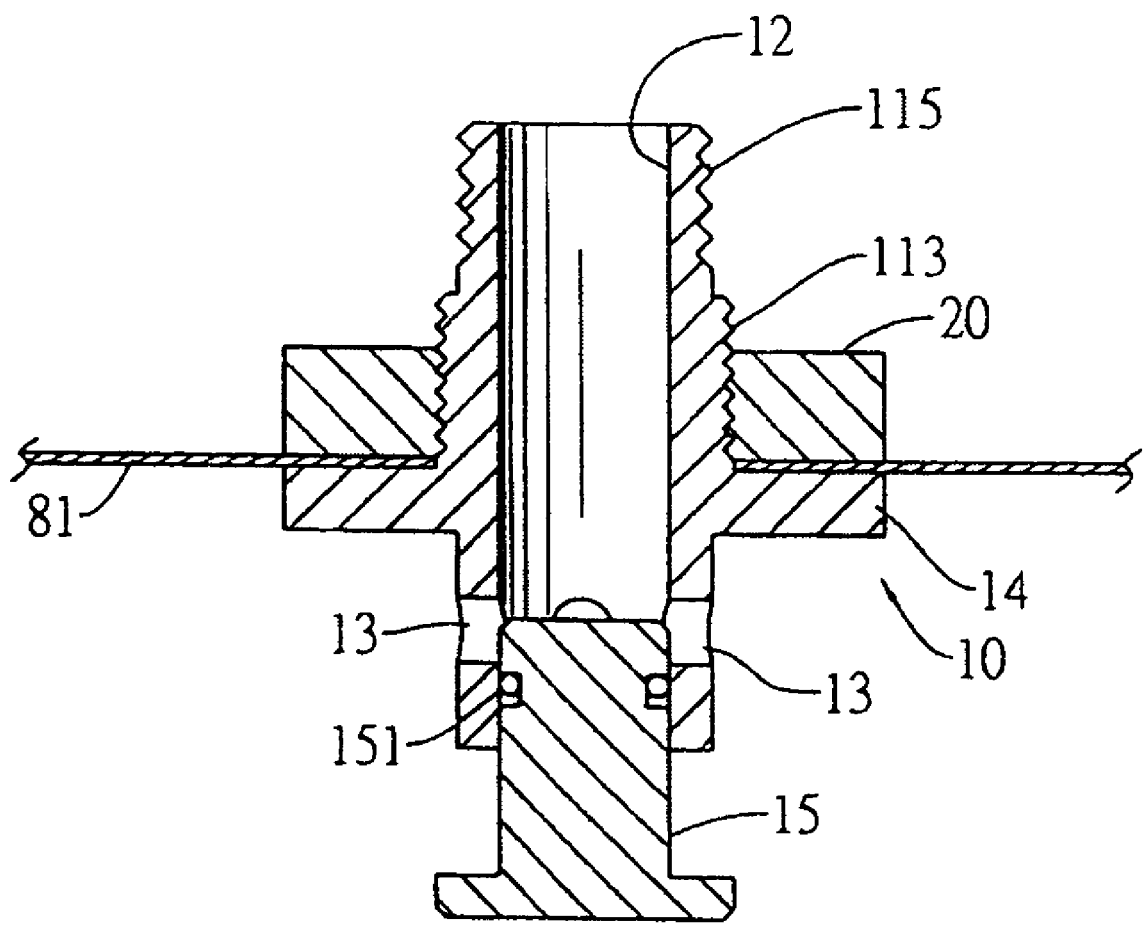
FIG. 5 is a cross sectional side view of the vacuum valve device in FIG. 4 with the sheet mounted securely between the base and the clip and with the valve shaft extending out to open the at least one outlet hole.
Figure 6:
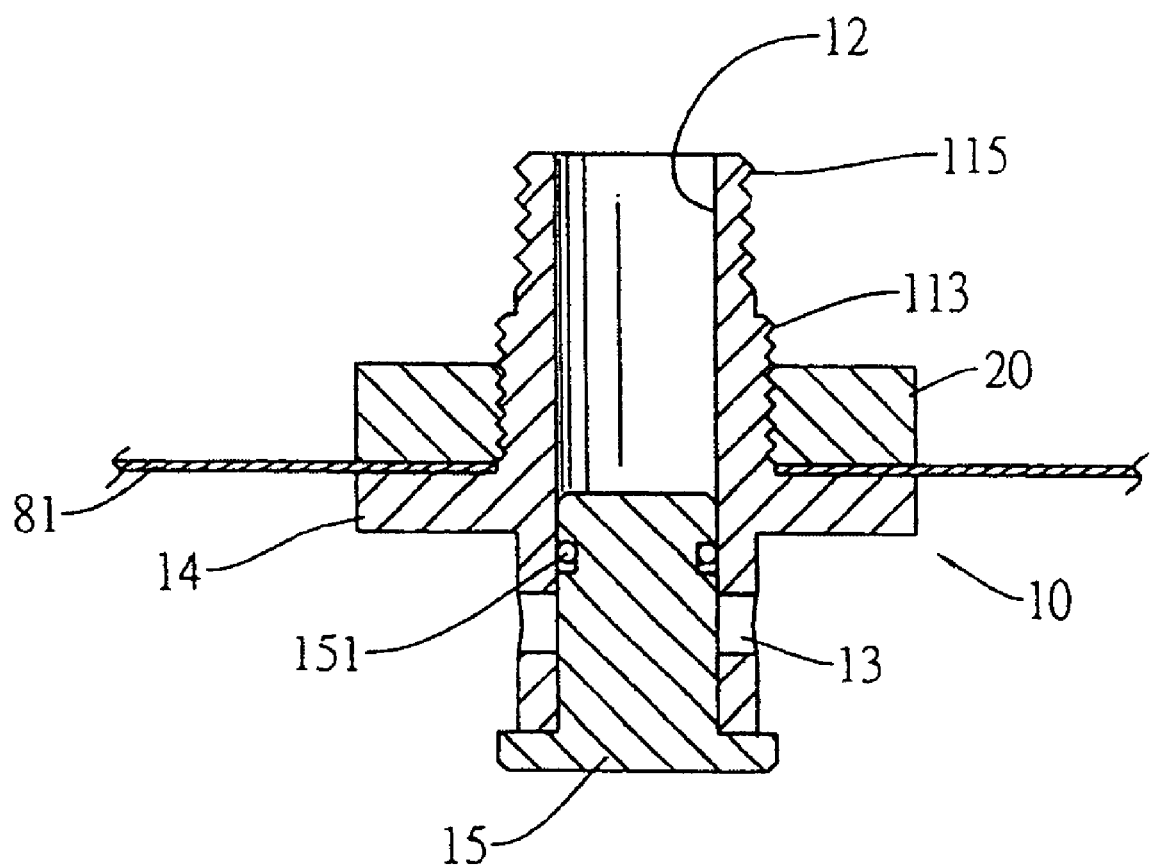
FIG. 6 is a cross sectional side view of the vacuum valve device in FIG. 5 with sheet and valve shaft retracting in to seal the at least one outlet hole.

The tube (11) is mounted on and penetrates through the sheet (81) or the bag (80) having a through hole (8L 11) defined through the sheet (81). With further reference to FIGS. 5 and 6, the tube (11) may be connected to a vacuum pump and has an inner open end, an outer open end, a central hole (12), at least one outlet hole (13), a clipping flange (14), a first outer thread (113) and a second outer thread (115). The central hole (12) is defined axially through the tube (11), communicates with the inner and outer open ends and has an inner surface. The all least one outlet hole (13) is defined transversely in the tube (11) and communicates with the central hole (12). The clipping flange (14) is annular, is formed on and extends radially outwardly from the tube (11) and is held inside the cavity in the bag (80). The first outer thread (113) is formed on the tube (11) adjacent to the clipping flange (14). The second outer thread (115) is formed on the tube (11) between the outer open end and the first outer thread (113).

The valve shaft (15) is mounted slidably in the inner open end of the tube (11), selectively seals the at least one outlet hole (13) and has an inner end, an outer end and an O-ring (151). The (O-ring (151) is mounted around the valve shaft (15) and hermetically contacts the inner surface of the central hole (12) to seal the at least one outlet hole (13) after the valve shaft (15) retracts in the central hole (12).

The clip (20) is annular, is mounted detachably around the tube (11) of the base (10) adjacent to the outer open end, cooperates with the clipping flange (14) to hermetically clip the sheet (81) of the bag (80) between the clip (20) and the clipping flange (14) aid seal the through hole (811). The clip (14) has a mounting hole and an inner thread (201). The mounting hole is defined axially through the clip (20), allows the tube (11) to be mounted through the mounting hole and has an inner surface. The inner thread (201) is formed on the inner surface of the mounting hole and engages detachably with the first outer thread (113) to securely mount the clip (20) on the base (10).

Figure 7:
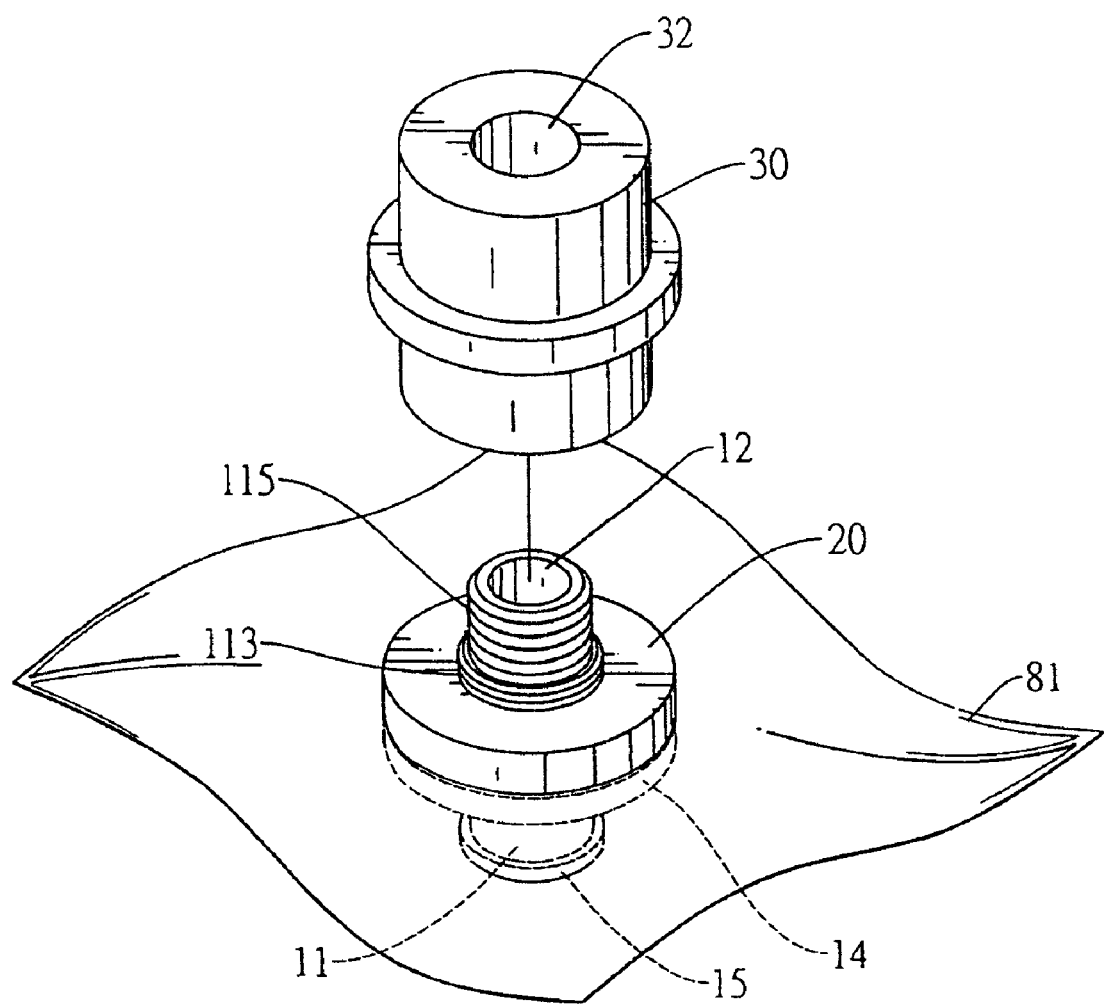
FIG. 7 is a partially exploded perspective view of the vacuum valve device in FIG. 2.
Figure 8:
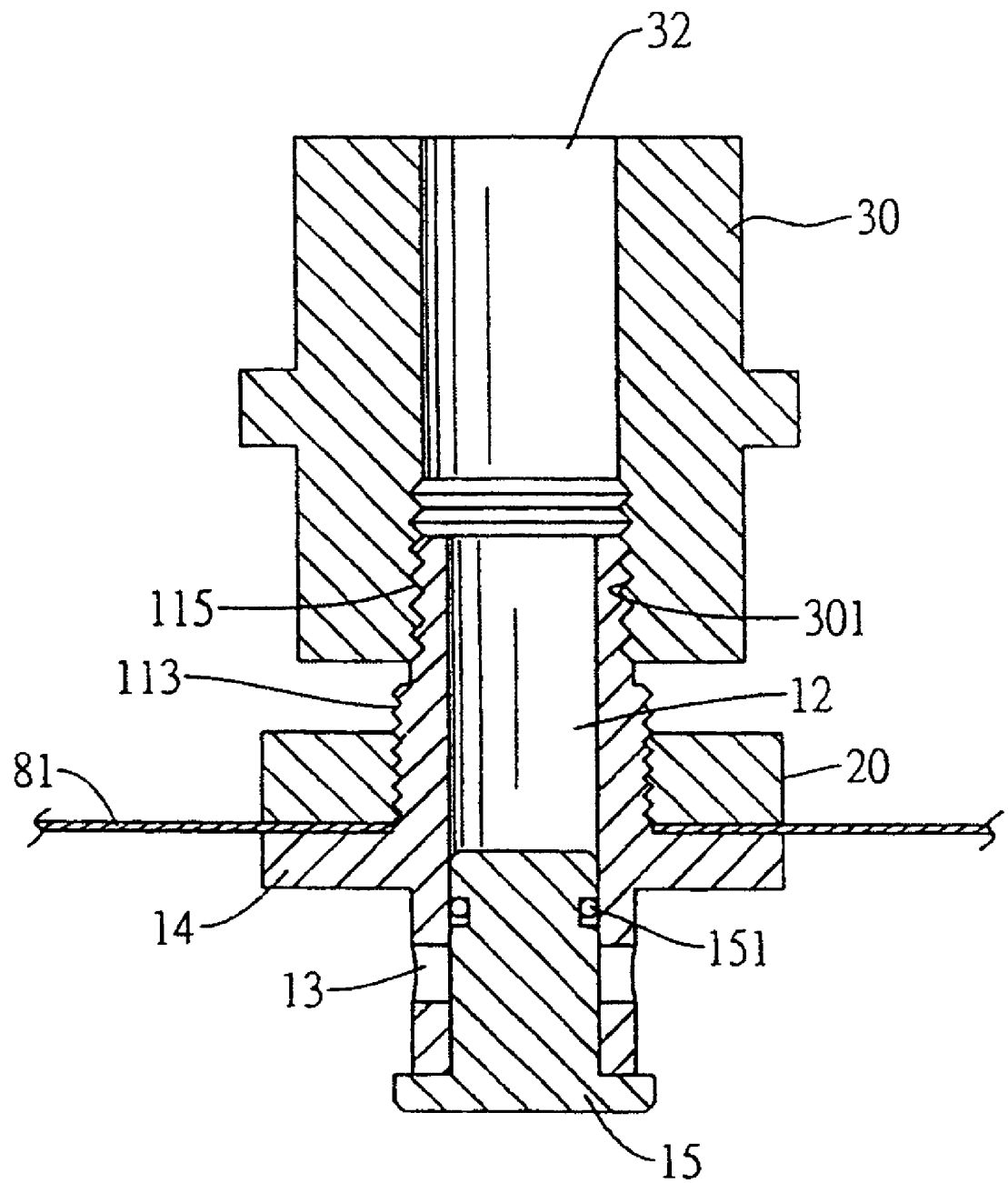
FIG. 8 is a cross sectional side view of the vacuum valve device in FIG. 7.

With reference to FIGS. 7 and 8, the adapter sleeve (30) is mounted detachably on the tube adjacent to the clip (20) and has a distal open end, a proximal open end, a mounting hole (32) and an inner thread (301). A diameter of the distal open end is different from that of the proximal open end so the distal open end may tightly hold a pipe from the vacuum pump. The mounting hole (32) s defined axially through the adapter sleeve (30), communicates with the distal and proximal open ends and has an inner surface. The inner thread (301) is formed on the inner surface of the mounting hole (32) in the adapter sleeve (30) adjacent to the distal open end and engages detachably with the second outer thread (115) on the tube (11).

With reference to FIGS. 1 and 5, the outer open end of the tube (11) penetrates through the through hole (811) in the sheet (81) of the bag (80) when the vacuum valve device is mounted to the bag (80). Then, the seal (83) on the bag (80) closes to seal the opening. Then, the clip (20) is mounted around the tube (11) and cooperates with the clipping flange (14) on the tube (11) to hermetically clip the sheet (81) and seal the through hole (811). Then, the valve shaft (15) extends out of the central hole (12) to communicate the at least one outlet hole (13) with the central hole (12). The adapter sleeve (30) maybe mounted on the tube: (11). Then, the pipe of the vacuum pump is connected to the adapter sleeve (30) or is connected directly to the outer open end of the tube (11) and pumps inside air out of the bag (80). After air is entirely pumped out of the bag (80), the valve shaft (15) is retracted in the central hole (12) to seal the at least one outlet hole (13) and completely seal the bag (30).

The vacuum valve device can detach from the bag (80) to be reused on another bag when the present bag (80) is damaged or smells due to the foods in the bag (80). People do not need to pay much money for a new vacuum valve device as the present bag (80) is damaged. Therefore, the vacuum valve device is economical and marketable.

Even though numerous characteristics and advantages of the present 9 invention have been set forth in the foregoing description, together with details of the structure and function or the invention, the disclosure is illustrative only. Changes may be made in the details, especially in matters of shape, size, and arrangement of parts within the principles of the invention to the full extent indicated by the broad general meaning of the terms in which the appended claims are expressed.

Figure 9:
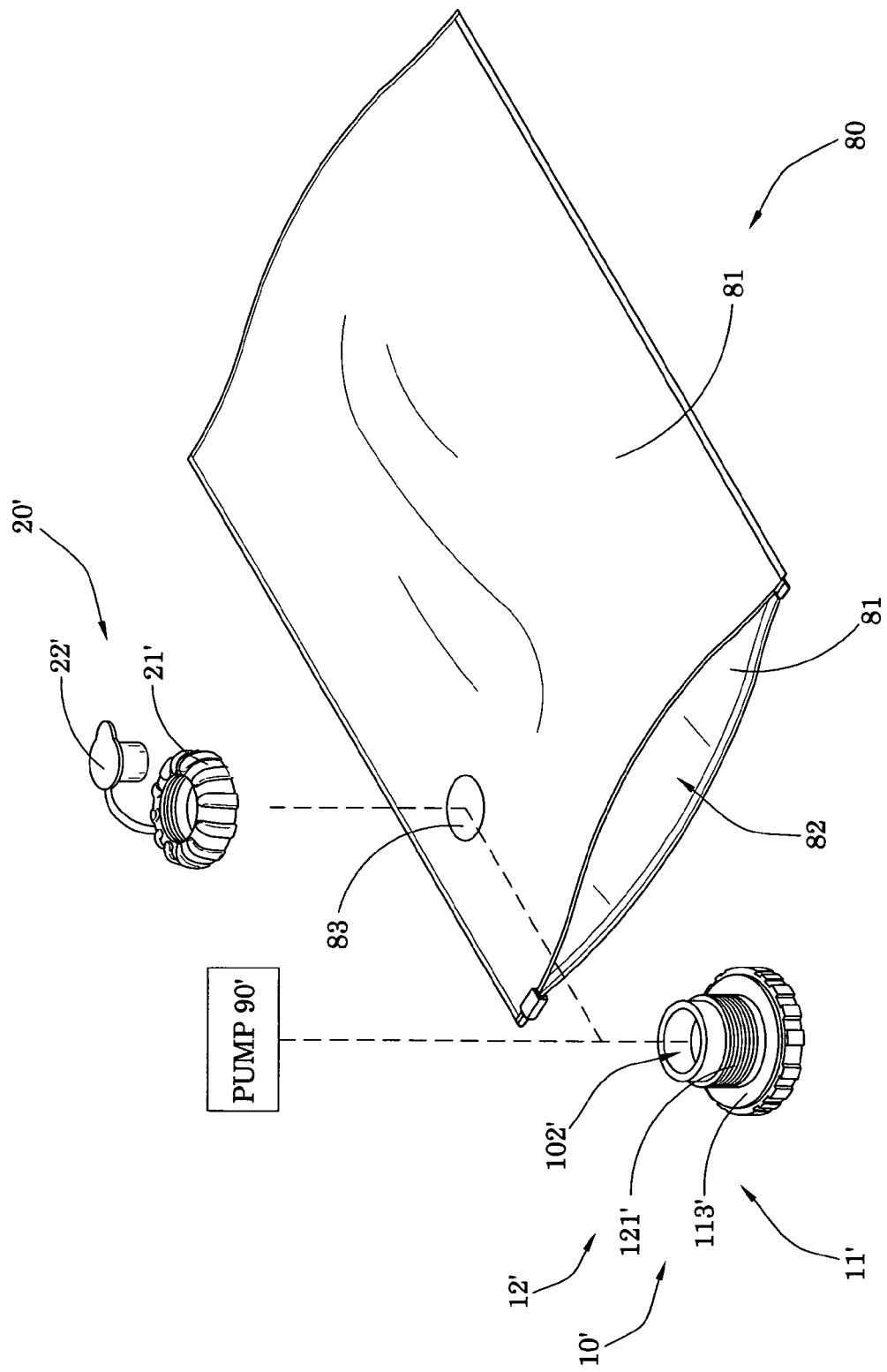
FIG. 9 is a perspective view of the vacuum valve device of the vacuum valve kit according to a second preferred embodiment of the present invention, illustrating the sheet is being sandwiched between a valve body and a valve retainer.
Figure 14:
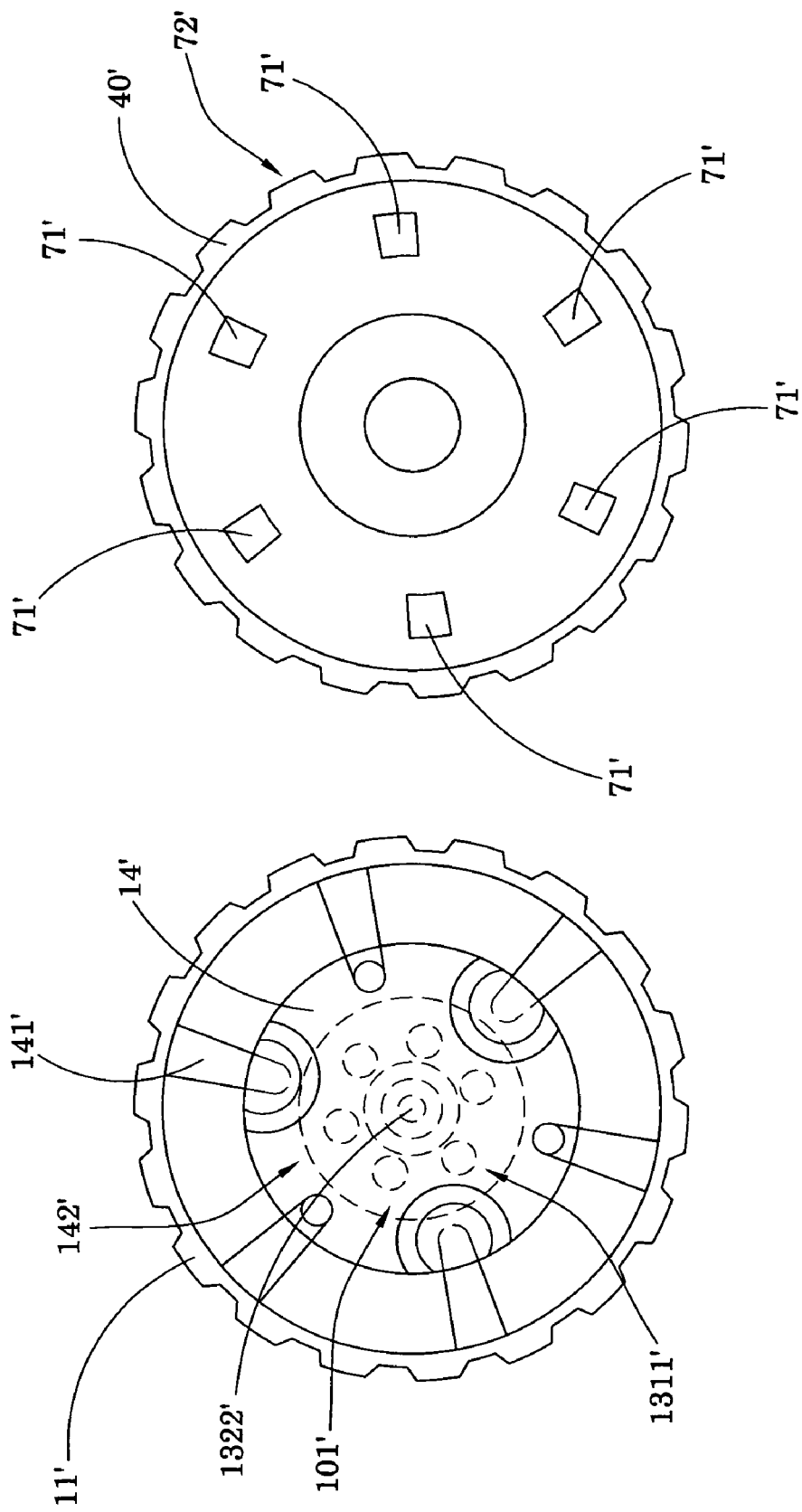
FIG. 14 is a bottom view of the valve body and the cutting base of the vacuum valve kit according to the second preferred embodiment of the present invention.

Referring to FIGS. 9 and 14, a vacuum valve kit according to a second preferred embodiment of the present invention is illustrated, wherein the vacuum valve kit comprises a vacuum valve device and a hole maker.

Figure 10:
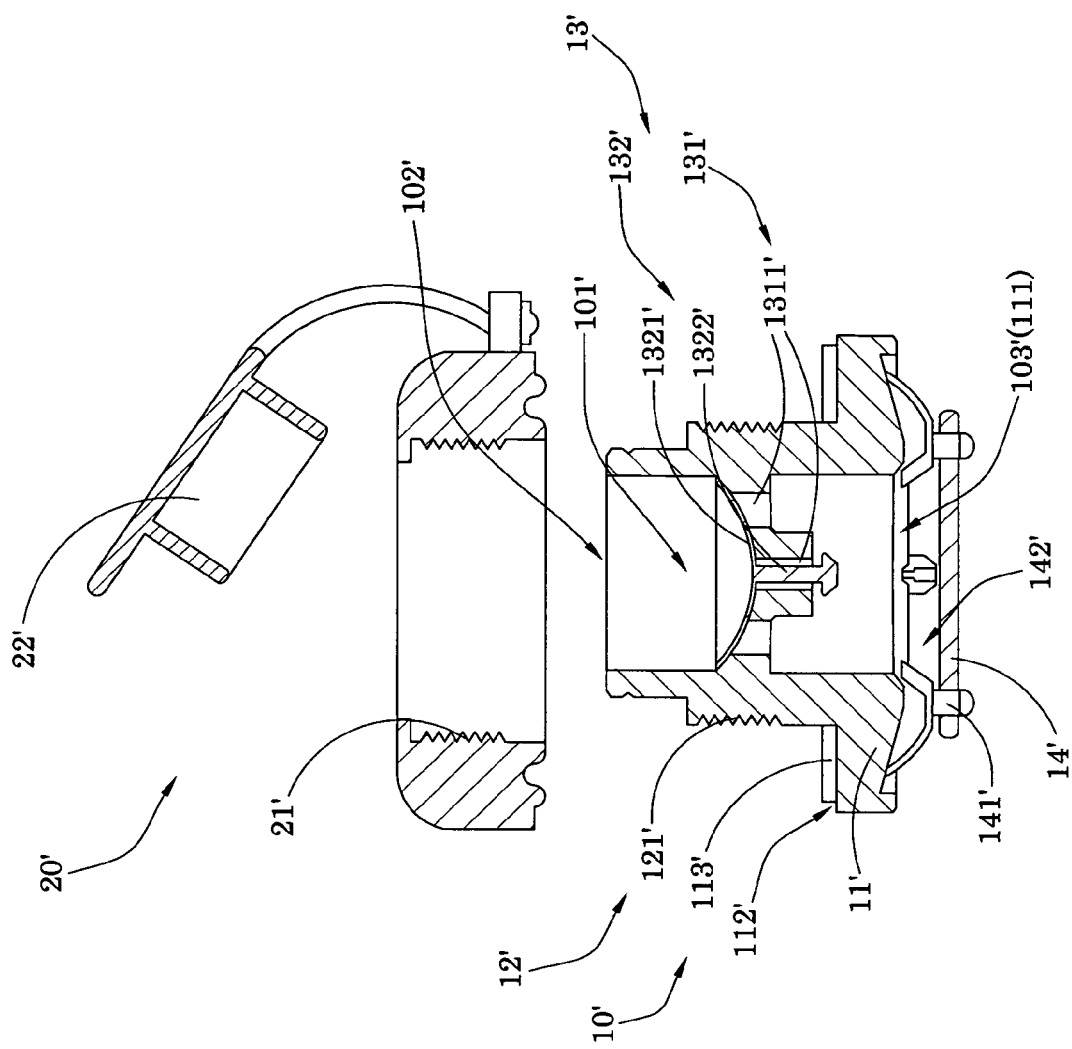
FIG. 10 is a sectional view of the vacuum valve device according to the second preferred embodiment of the present invention.
Figure 11:
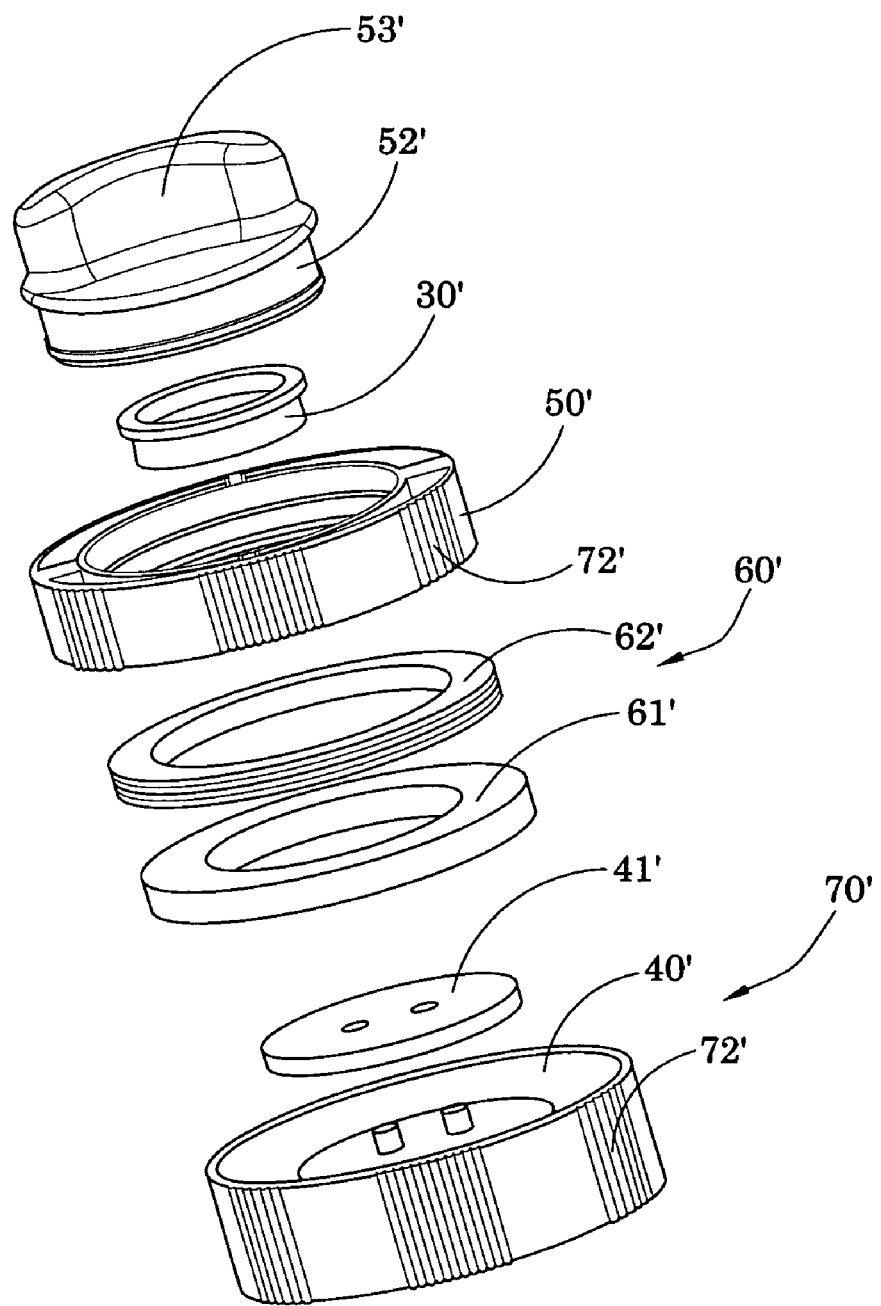
FIG. 11 is an exploded perspective view of the hole maker of the vacuum valve kit according to the second preferred embodiment of the present invention.
Figure 12:
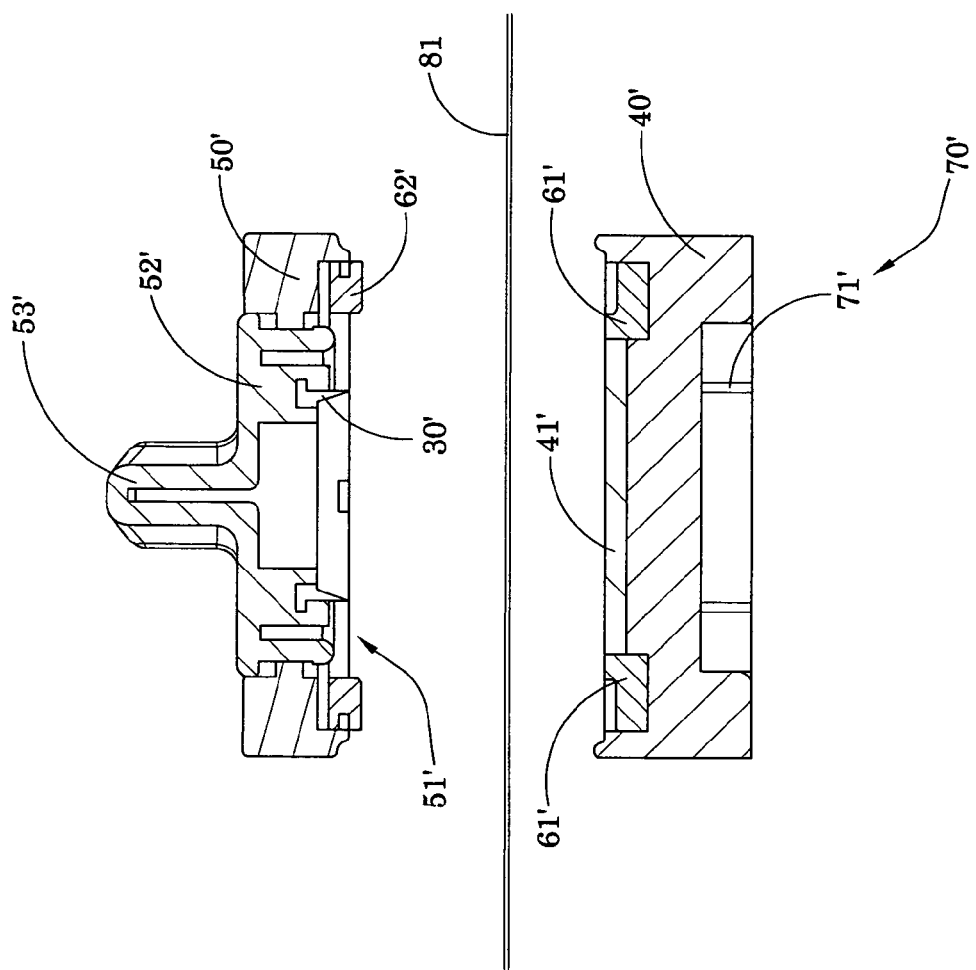
FIG. 12 is a sectional view of the hole maker of the vacuum valve kit according to the second preferred embodiment of the present invention.

As shown in FIGS. 9 and 10, the vacuum valve kit is provided for detachably coupling with a bag 80, which is embodied as a sealing bag, for sucking out an air within a bag, so that the bag 80 is able to preserve an object, such as food, within the bag 80 in a vacuum environment, so as to minimize the storing space.

The bag 80, which is an existing sealing bag, comprises two sheets 81 overlapping with each other to form a sealing cavity 82 therewithin for storing purpose, wherein the sealing cavity 82 has an opening having a sealing arrangement thereat for sealing the sealing cavity 82 within the bag 80 in an air-tighten manner. The bag 80 further has a through hole 83 provided at one of the sheets 81 of the bag 80, so that the vacuum valve device is able to detachably mount with the bag 80 for vacuuming via the through hole 83. Accordingly, the sealing arrangement can be a zipper provided at the opening of the bag 80 to selectively seal the sealing cavity 82 in a re-sealing manner.

The vacuum valve device comprises a valve body 10' and a valve retainer 20' detachably coupling with said valve body 10' for securely sandwiching the sheet 81 between the valve body 10' and the valve retainer 20' around the through hole 83 in an air-tight manner.

The valve body 10' has an air passage 101' and defines a first opening 102' and a second opening 103', wherein the second opening 103' is disposed within the sealing cavity 82 at a position that the air passage 101' is extended through the through hole 83 on the sheet 81, so as to allow the air within the bag 80 flowing out to the first opening 102' through the air passage 101'.

The valve body 10' further comprises a valve base 11' and a tubular valve shaft 12' upwardly and coaxially extended from the valve base 11' to define the air passage 103' within the valve shaft 12'. The valve base 11' has a center through base hole 111' communicating with the air passage 101' via mounting the valve shaft 12' with the valve base 11', wherein the second opening 103' is defined at the base hole 111' of the valve base 11'. The valve shaft 12' has a free end disposed out of the sealing cavity 82 to define the first opening 102' at the free end of the valve shaft 12', while the second opening 103' is disposed within the sealing cavity 82, so as to allow the air within the sealing cavity 82 flowing from the second opening 103' at the base hole 111' to the air passage 101'.

The valve retainer 20' is embodied as a ring shape having an inner threaded portion 21' at an inner ring surface of the valve retainer 20'. The valve shaft 12' of the valve body 10' further has an outer threaded portion 121' provided at an outer surface of the valve shaft 12', wherein the valve retainer 20' is able to rotatably coupling with the valve shaft 12' via the inner threaded portion 21' and the outer threaded portion 121'.

The valve base 11' has a sealing platform 112' located at an upper surface of the valve base 11', wherein sealing platform 112' is coupling with the valve retainer 20' to sandwich the sheet 81 of the bag 80 therebetween, while the valve retainer 20' is rotatably coupling with the valve body 10' via the valve shaft 12'. Therefore, the inner threaded portion 21' is detachably engaging with the outer threaded portion 121' of the valve shaft 12', such that the valve retainer 20' is rotatably coupled with the valve shaft 12' until the valve retainer 20' biases against the sealing platform 112' of the valve base 11'.

It is appreciated that the sealing platform 112' is also adapted as a stopper to stop and retain the valve retainer 20' in position while the valve retainer 20' is downwardly rotating at the valve shaft 12' via the inner and outer threaded portion 21', 121' to bias against the sealing platform 112'. In addition, the sealing platform 112' provides a relatively large sealing surface to contact with the sheet 81 of the bag 80 around the through hole 83. Preferably, the diameter of the valve base 11' is corresponding to the diameter of the valve retainer 20' to seal and sandwich the sheet 81 of the bag 80 in an air-tight manner.

According to the preferred embodiment, the valve retainer 20' can be detached from the valve body 10' to remove the vacuum valve device of the present invention from the bag 80, and can be re-attach the vacuum valve device to another bag 80 by rotatably coupling the valve retainer 20' with the valve body 10'. Therefore, the vacuum valve device of the present invention is re-useable to incorporate with any existing sealing bag having the sealing cavity 82.

In order to securely coupling the vacuum valve device with the through hole 83 at the sheet 81 and tightly seal the sealing cavity 82 in the air-tight manner, a sealing ring 113' is provided at the sealing platform 112' of the valve base 11'. When the valve retainer 20' is rotatably coupling at the valve shaft 12' of the valve body 10' to sandwich the sheet 81 therebetween, the sealing ring 113' is contacting with an inner side of the sheet 81 in an air-tight manner. Preferably, the sealing ring 113' is a sealing layer provided on the sealing platform 112' to seal and contact with the sheet 81 of the bag 80 in an air-tight manner.

In other words, when the valve retainer 20' is rotatably coupling with the valve shaft 12', the sheet 81 is sandwiched between the sealing ring 113' and the valve retainer 20' to prevent the air within the sealing cavity 82' leaking from the through hole 83 at the sheet 81. The sealing ring is preferably made by an elastic material to provide the air-tight performance.

Thus, the valve base 11' of the valve body 10' is disposed within the sealing cavity 82 at a position that the air passage 101' at the valve shaft 12' is extended through the through hole 83 of the bag 80 for detachably coupling the valve retainer 20' with the valve body 10' via the valve shaft 12'. It is appreciated that the through hole 83 is slightly larger than the diameter of the valve shaft 12', so that the valve shaft 12' is able to pass through the through hole 83 to securely sandwich the sheet 81 between the valve base 11' of the valve body 10' and valve retainer 20'.

Accordingly, the valve body 10' further comprises a valve member 13' provided within the air passage 101' at a position between the first opening 102' and the second opening 103'. The valve member 13' is provided for controllably allowing the air within the sealing cavity 82 passing through the air passage 101' in a one-way manner.

The valve member 13', which is a one-way valve, comprises a valve seat 131' having a plurality of valve openings 1311' spacedly formed thereat for aligning with the second opening 103' at the base hole 111', and a flexible diaphragm 132'. The diaphragm 132' comprises a flexible air-sealing layer 1321' sealably and movably sitting on the valve seat 131', and a retention element 1322' integrally extended from the air-sealing layer 1321' to a bottom side of the valve seat 131' for retaining the air-sealing layer 1321' being movably overlaid on the valve seat 131', so as to selectively seal with the valve openings 1311' at the valve seat 131'.

Accordingly, the valve seat 131' is mounted within the air passage 101' at the valve shaft 12', and the flexible valve diaphragm 132' is movably supported on the valve seat 131' to move between a sealed position and an unsealed position. At the unsealed position, the air-sealing layer 1321' of the valve diaphragm 132' is upwardly moved apart from the valve seat 131', such that the air within the sealing cavity 82 is enabled to be sucked out from the sealing cavity 82 through the valve openings 1311' within the air passage 101'. At the sealed position, the valve diaphragm 132' sits on the valve seat 131' to air-seal the valve openings 1311', so as to prevent the air returning back to the sealing cavity 82 through the air passage 101'.

Therefore, the retention element 1322' is made by flexible material, such as elastic material, for retaining the air-sealing layer 1321' at the unsealed position in a predetermined distance between the air-sealing layer 1321' and the valve seat 131' for allowing the air to pass through the air passage 101', and for returning the air-sealing layer 1321' back to the normally sealed position for preventing the air returning back to the sealing cavity 82.

In other words, when a pump is automatically or manually sucking out the air within the sealing cavity 82 through the air passage 101', a sucking force is applied on the air sealing layer 1321' to upwardly move the air-sealing layer 1321' in the predetermined distance via the retention element 1322'. When the sucking force is disappeared, the air-sealing layer 1321' is moved back via the retention element 1322' at the sealed position.

It is worth to mention that the atmosphere pressure, normally 1 atm, is greater than the pressure within the sealing cavity 82, which is approximately close to 0 atm, such that the atmosphere pressure is downwardly pressing the air-sealing layer 1321' of the valve diaphragm 132' of the valve member 13' to securely close the valve openings 1311', so as to prevent the air returning back through the air passage 101' to the sealing cavity 82. Thus, the vacuum valve device is capable of sucking out the air within the sealing cavity 82, and controlling the air flow only in one direction to prevent the air flowing back to the sealing cavity 82.

As mentioned above, the valve retainer 20' further comprises a valve cover 22' adapted for detachably engaging with the first opening 102' at the free end of the valve shaft 12' to enclose the air passage 101' in the valve shaft 12' after the valve body 10' is coupling with the valve retainer 20' to sandwich the sheet 81 therebetween to suck out the air. Thus, the valve cover 22' provides another protection for securely prohibiting the air returning back to the sealing cavity 82.

It is appreciated that the valve cover 22' is preferably made by a flexible material having a flexible elongated connecting element extended from a peripheral edge of the valve retainer 20' to attach the valve cover 22' therewith, such that the valve cover 22' is remained to attach with the valve retainer 20' while uncovering the first opening 102', so as to prevent missing the valve cover 22'. In addition, the valve cover 22' can only cover at the first opening 102' at the free end of the valve shaft 12' after the valve retainer 20' detachably couples with the valve body 10'. In other words, the valve retainer 20' must seal and couple with the valve body 10' first for the vacuuming operation before the valve cover 22' covers at the first opening 102' of the valve shaft 12'.

The valve base 11' of valve body 10' and the valve retainer 20' further has a plurality of protruding portion to form an uneven peripheral surface at the peripheral edge of the valve base 11' of the valve body 10' and the valve retainer 20' respectively, so that the protruding portion is capable of providing a relatively more frictions while rotatably coupling the valve body 10' with the valve retainer 20'. It is appreciated that the peripheral surface of each of the valve base 11' and the valve retainer 20' can be a rough surface or a teeth-surface for enhancing the gripping ability of the valve body 10' and the valve retainer 20' to detachably couple with each other.

Accordingly, the valve body 10' further comprises a retention member 14' downwardly provided below the valve base 11' for being apart from the second opening 103' at the base hole 111' and aligning therewith. A plurality of linking elements 141' are downwardly extended from the bottom side of the valve base 11' for connecting with and retaining the retention member 14' in a position underneath the base hole 111' and being apart from the valve base 11' in a predetermined distance, wherein a plurality of opening slots 142' are transversely formed between two adjacent linking elements 141' to allow the air within the sealing cavity 82 passing through the opening slots 142' to the air passage 103' within the valve shaft 12' via the second opening 103' at the base hole 111'.

It is worth to mention that the retention member 14' underneath the valve base 11' to form the transverse opening slots 142' prevents an object stored within the sealing cavity 82 of the bag 80 to directly contact with the base hole 111' to block the air flowing from the sealing cavity 82 to the air passage 101'. In addition, the retention member 14' also prevents another sheet 82 being sealed at the second opening 103' during vacuuming operation.

As shown in FIGS. 11 to 14 of the drawings, the hole maker adapted for making the through hole 83 on the sheet 81 is illustrated, which comprises a circular cutting blade 30' for making the through hole 83 on the sheet 81, so that the cutting blade 30' enables the air passage 101' fittingly extending through the through hole 83' made by the hole maker. The circular cutting blade 30' has a diameter corresponding to the valve shaft 12' of the valve body 1', so that the valve shaft 12' is able to extend out of the through hole 83 while the valve base 11' is disposed within the sealing cavity 82.

The hole maker further comprises a cutting base 40' and a cutting head 50', wherein the cutting base 40' has a cutting platform 41' disposed within the sealing cavity 82. The cutting head 50' has a cutting face 51', wherein the cutting blade 30' is mounted at the cutting face 51', such that the cutting face 51' is contacting with the sheet 81 to align with the cutting platform 41' at a position that the sheet 81 is being sandwiched therebetween, so as to cut through the sheet 81 to form the through hole 83 via the cutting blade 30'.

The hole maker also comprises a magnetic arrangement 60', which comprises a first magnetic element 61' provided at the cutting platform 41' of the cutting base 40' and a second magnetic element 62' provided at the cutting face 51' of the cutting head 50' to magnetically coupling with the first magnetic element 62', such that the cutting face 41 of cutting head 50' is alignedly retained with the cutting platform 51' of the cutting base 50', so as to precisely make the through hole 83 on the sheet 81.

Accordingly, the first and second magnetic elements 61', 62' have a corresponding annular shape to provide a relatively magnetic attracting surface therebetween so as to stably hold the corrected alignment between the cutting base 40' and the cutting head 50'.

The first magnetic element 61' is embodied as a magnetic attractive material, such as a metal plat or ring, and the second magnetic element 62' is embodied as a magnet for magnetically coupling with the magnetic attracted material of the first magnetic element 61', so as to align the cutting face 51' with the cutting platform 41' to precisely cut through the sheet 81 to form the through hole 83 via the cutting blade 30'.

It is worth to mention that the first magnetic element 61' and the second magnetic element 62' are interchangeable. Both of the first magnetic element 61' and second magnetic element 62' can be magnets having opposite magnetic field to magnetically coupling with each other.

It is appreciated that the circular cutting blade 30' has the diameter, which is slightly larger than the diameter of the valve shaft 12'. In other words, the circumference of the circular cutting blade 30' is slightly larger than the circumference of the valve shaft 12', in such a manner that after the cutting blade 30' cuts the sheet 81 to form the through hole 83, the valve shaft 12' is fittingly extended through the through hole 83 from the sealing cavity 82, so as to prevent any air returning back to the sealing cavity 82 through the through hole 83.

As mentioned above, the cutting head 50' further has a tubular head holder 52' coaxially aligning with the cutting base 40', and an operation head 53' movably and rotatably coupled with the head holder 50' in a vertically movable manner. The cutting blade 30' is mounted on the operation head 53' to coaxially align with the cutting platform 41' of the cutting base 40', which is arranged in such a manner that when the head holder 52' is aligning with the cutting base 40' to sandwich the sheet 81 therebetween, the operation head 53' is pressed downwardly to drive the cutting blade 30' in a rotatable manner through the sheet 81 for making the through hole 83 thereon. In other words, the user is able to downwardly press and rotatably turn the operation 53' with respect to the head holder 52' for cutting the through hole 83 at the sheet 81.

The upper side of the operation head 53', which is the opposite side of the cutting face 51', forms a handle for the user to hold the operation head 53' tightly such that the user is able to hold the handle of the operation head 53' to press and turn the operation head 53' for making the through hole 83 on the sheet 81.

Accordingly, the first magnetic element 61' is preferably provided at a peripheral edge of the cutting platform 41' while the second magnetic element 62' is provided at a peripheral edge of the cutting face 51' for aligning with the first magnetic element 61', in such a manner that the magnetic arrangement 60' is able to stably and precisely coupling the cutting base 40' with the cutting head 50', so as to precisely retain the cutting blade 30' to cut through the sheet 81.

In other words, the second magnetic element 62' is preferably provided at a position to encircle the operation head 53' coupled with tubular head holder 52' for aligning with the cutting platform 41' of the cutting base 40', so that the cutting blade 30' mounted on the operation head 53' is able to precisely cut through the sheet 83, while the first magnetic element 61' and second magnetic element 62' are securely coupling with each other.

It is appreciated that the cutting platform 41' is preferably encircled by the first magnetic element 61' is made by a material having a hardness greater than the cutting blade 30', such as glass, so that when the cutting blade 30' is being pressed downwardly to cut through the sheet 81 in the rotatable manner, the cutting platform 41' prevents the cutting base 40' to be worn out by the cutting blade 30'.

In order to assist the valve base 10' rotatably coupling with the valve retainer 20', a hand-actuating adapter 70' is further provided at a bottom side of the cutting base 40', so that the hand-actuating adapter 70' is capable of detachably engaging with the valve base 10' disposed within the sealing cavity 82 to enhance the ability for applying a torque force on the valve base 10', so as to easily rotating the valve body 10' to rotatably coupling with the valve retainer 20'.

The hand actuating adapter 70' has a plurality of engaging teeth 71' spacedly protruded from the bottom side of the hole maker, which is adapted for detachably engaging with the retention member 14' at the bottom side of the valve body 10'. More specifically, the engaging teeth 71' are capable of detachably engaging with the linking elements 141' of the retention member 14' side-by-side, so that when the hand-actuating adapter 70' provided at the bottom side of the cutting base 40' is engaging with the valve body 10' via the engaging teeth 71', the valve body 10' is held by the hand-actuating adapter 70' to rotatably couple with the valve retainer 20'.

Figure 13:
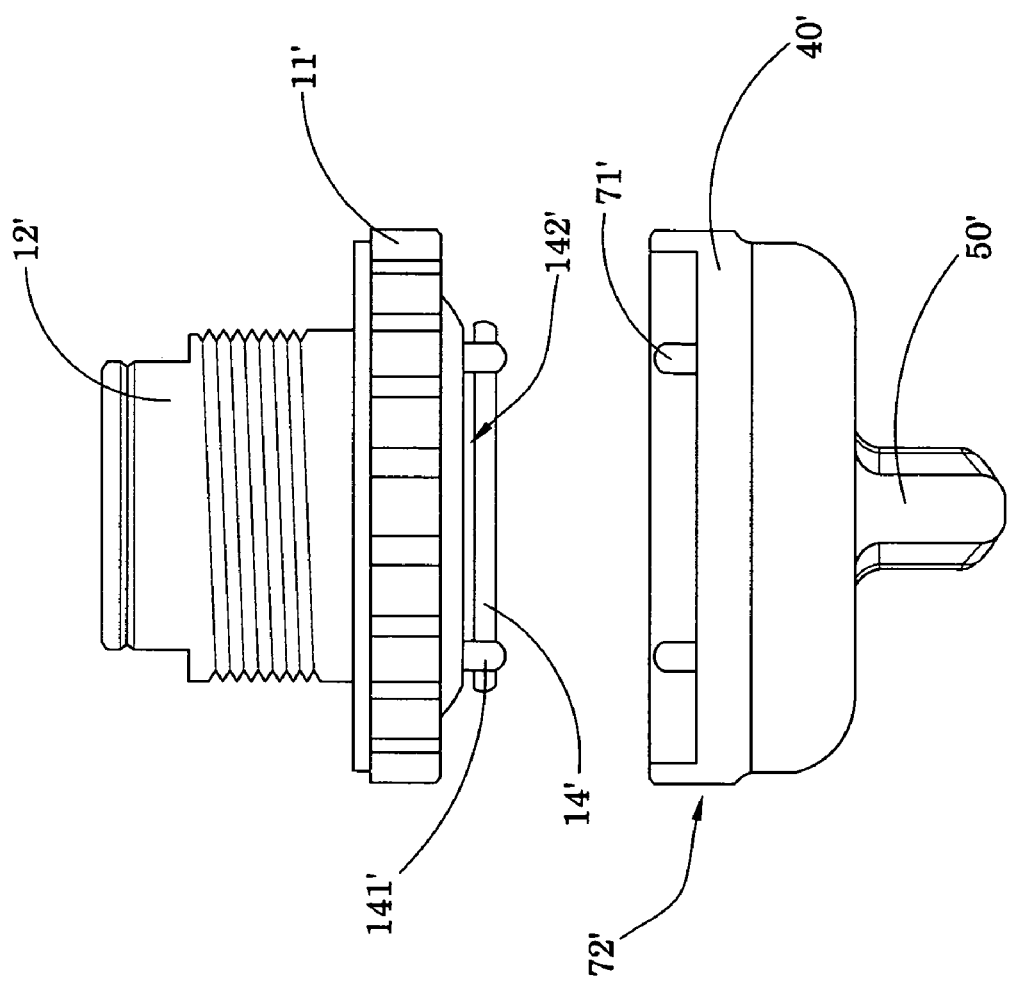
FIG. 13 is a side view of the valve body and the cutting base according to the second preferred embodiment of the present invention, illustrating the valve body being detachably engaged with the bottom side of the cutting base through the hand-actuating adapter.

As shown in FIGS. 13 and 14, six engaging teeth 71' are radially and spacedly formed at the bottom side of the cutting base 40', which is the opposite side of the cutting platform 41', geometrically matching with the six linking elements 141' of the retention member 14'. Therefore, when the engaging teeth 71' are fittingly engaged with the linking elements 141' respectively, the user is able to grip the hand actuating adapter 70', instead of the valve base 11', to rotatably attach the valve retainer 20' to the valve base 11' or to rotatably detach the valve retainer 20'.

A hand-contacting surface 72' of the hand-actuating adapter 70' further provided at an outer circumferential side of the cutting base 40' and the cutting head 50' of the hole maker. The hand-contacting surface 72' has a plurality protruding portion to increase the friction at the circumferential outer surface of the hole maker, so that when the hand-contacting surface 72' of the cutting base 40' disposed within the sealing cavity 82 is being held, the hand-contacting surface 72' is capable of providing the frictional force for firmly holding the cutting base 40' to rotatably couple the valve body 10' with the valve retainer 20'.

It is appreciated that the cutting base 40' has a larger outer circumference than the valve base 11', so that the cutting base 40' is relatively easier to be held while the hand-actuating adapter 70' is detachably engaging with the valve body 10', so as to easily apply the torque force to rotatably couple the valve body 10' with the valve retainer 20'.

Accordingly, the vacuum valve device further has an outer frictional surface provided at an outer circumferential surface of the valve body 10' and/or valve retainer 20', wherein the outer frictional surface has a plurality of protruding portion provided thereon for increasing the frictional force, so that the valve body 10' and valve retainer 20' are able to be held firmly to apply the rotational force for rotatably coupling the valve body 10' with valve retainer 20'.

Therefore, the engaging teeth 71' may also be provided to detachably engage with the outer frictional surface of the valve body 10' for assisting the valve body 10' to rotatably couple with the valve retainer 20'.

The vacuum valve kit may further comprises a pump 90' for manually or automatically pumping out of air within the sealing cavity 82, in such a manner that the air is able to be sucked out from the second opening 103' at the base hole 111' disposed within the sealing cavity 82 to the air passage 101' in the valve shaft 12', so as to allow the air within the sealing cavity 82 flowing to the surroundings through the first opening 102' at the free end of the valve shaft 12'.

It is appreciated that the adapter sleeve 30 as mentioned in FIGS. 7 and 8, can be incorporated to detachably couple with the valve body 10', wherein the distal open end of the adapter sleeve 30 can be detachably coupled with the first opening 102' of the valve shaft 12' to communicate the axially mounting hole 32 of the adapter sleeve 30 with the air passage 101'. Accordingly, the diameter of the proximal open end of the adapter sleeve 30 is different from the diameter of the distal open end thereof for fitting different sizes of the vacuuming tool. In addition, the detachable attachment between the adapter sleeve 30 and the valve shaft 12' can be the above mentioned structure by rotatably engaging the inner thread of the adapter sleeve 30 with the outer thread of the valve shaft 12'.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vacuum valve kit for a bag having a sealing cavity formed between two sheets and a through hole formed at one of said sheets, comprising:
   a vacuum valve device, which is a one-way valve, comprising a valve body, having an air passage, adapted for being disposed within said sealing cavity at a position that said air passage is extended through said through hole of said sheet, a valve retainer detachably coupling with said valve body for securely sandwiching said sheet between said valve body and said valve retainer around said through hole in an air-tight manner, and a valve member disposed within said air passage for enabling air within said sealing cavity being sucked thereout in only one direction so as to prevent said air being returning back to said sealing cavity; and
   a hole maker which comprises a circular cutting blade having a diameter corresponding to said valve body for making said through hole on said sheet so as to enable said air passage fittingly extending through said through hole;
   wherein said hole maker comprises a cutting base having a cutting platform adapted for being disposed in said sealing cavity, a cutting head having a cutting face adapted for being located on said sheet to align with said cutting platform at a position that said sheet is sandwiched between said cutting platform and said cutting face, wherein said cutting blade is mounted at said cutting face of said cutting head for cutting through said sheet to form said through hole thereon.

2. The vacuum valve kit, as recited in claim 1, wherein said hole maker further comprises a magnetic arrangement which comprises a first magnetic element provided at said cutting platform and a second magnetic element provided at said cutting face to magnetically couple with said first magnetic element so as to alignedly retain said cutting head with said cutting platform for precisely making said through hole on said sheet.

3. The vacuum valve kit, as recited in claim 2, wherein said cutting head comprises a tubular head holder coaxially aligning with said cutting base, and an operation head slidably and rotatably coupled within said head holder in a vertically movable manner, wherein said cutting blade is mounted at said operation head and arranged in such a manner that when said head holder is aligned with said cutting base for sandwiching said sheet therebetween, said operation head is pressed downwardly to drive said cutting blade in a rotatable manner through said sheet for making said through hole thereon.

4. The vacuum valve kit, as recited in claim 3, wherein said first magnetic element is provided at said head holder to magnetically engage with said second magnetic element on said cutting platform of said cutting base.

5. The vacuum valve kit, as recited in claim 4, wherein said valve body comprises a valve base having a center through base hole disposed within said sealing cavity, and a tubular valve shaft upwardly and coaxially extended from said valve base to define said air passage within said valve shaft, wherein said valve retainer is rotatably coupled with said valve shaft for sandwiching said sheet between said valve retainer and said valve base.

6. The vacuum valve kit, as recited in claim 5, wherein said hole maker further comprises a hand-actuating adapter provided at a bottom side of said hole maker to detachably engage with a bottom side of said valve body for assisting said valve body being rotatably coupled with said valve retainer.

7. The vacuum valve kit, as recited in claim 6, wherein said hand-actuating adapter comprises a plurality of engaging teeth spacedly protruded from said bottom side of said hole maker and a hand-contacting surface formed at an outer circumferential side of said hole maker such that when said engaging teeth are detachably engaged with said bottom side of said valve body, said valve body is held by said hand-actuating adapter to rotatably couple with said valve retainer.

8. The vacuum valve kit, as recited in claim 7, wherein said valve body further comprises a retention member spacedly mounted underneath said valve base to align with said base hole and to define a plurality of transverse opening slots between said retention member and said valve base for said air passing to said air passage through said opening slots, wherein said engaging teeth are detachably engaged with said retention member to hold said valve body in position.

9. The vacuum valve kit, as recited in claim 1, wherein said cutting head comprises a tubular head holder coaxially aligning with said cutting base, and an operation head slidably and rotatably coupled within said head holder in a vertically movable manner, wherein said cutting blade is mounted at said operation head and arranged in such a manner that when said head holder is aligned with said cutting base for sandwiching said sheet therebetween, said operation head is pressed downwardly to drive said cutting blade in a rotatable manner through said sheet for making said through hole thereon.

10. A vacuum valve kit for a bag having a sealing cavity formed between two sheets and a through hole formed at one of said sheets, comprising:
   a vacuum valve device, which is a one-way valve, comprising a valve body, having an air passage, adapted for being disposed within said sealing cavity at a position that said air passage is extended through said through hole of said sheet, a valve retainer detachably coupling with said valve body for securely sandwiching said sheet between said valve body and said valve retainer around said through hole in an air-tight manner, and a valve member disposed within said air passage for enabling air within said sealing cavity being sucked thereout in only one direction so as to prevent said air being returning back to said sealing cavity; and
   a hole maker which comprises a circular cutting blade having a diameter corresponding to said valve body for making said through hole on said sheet so as to enable said air passage fittingly extending through said through hole;
   wherein said valve body comprises a valve base having a center through base hole disposed within said sealing cavity, and a tubular valve shaft upwardly and coaxially extended from said valve base to define said air passage within said valve shaft, wherein said valve retainer is rotatably coupled with said valve shaft for sandwiching said sheet between said valve retainer and said valve base;
   wherein the diameter of said cutting blade is slightly larger than an outer diameter of said valve shaft in such a manner that after said cutting blade cuts said through hole on said sheet, said valve shaft is fittingly extended through said through hole from said sealing cavity;

wherein said hole maker further comprises a hand-actuating adapter provided at a bottom side of said hole maker to detachably engage with a bottom side of said valve body for assisting said valve body being rotatably coupled with said valve retainer.

11. The vacuum valve kit, as recited in claim 10, wherein said hand-actuating adapter comprises a plurality of engaging teeth spacedly protruded from said bottom side of said hole maker and a hand-contacting surface formed at an outer circumferential side of said hole maker such that when said engaging teeth are detachably engaged with said bottom side of said valve body, said valve body is held by said hand-actuating adapter to rotatably couple with said valve retainer.

12. The vacuum valve kit, as recited in claim 11, wherein said valve body further comprises a retention member spacedly mounted underneath said valve base to align with said base hole and to define a plurality of transverse opening slots between said retention member and said valve base for said air passing to said air passage through said opening slots, wherein said engaging teeth are detachably engaged with said retention member to hold said valve body in position.

13. The vacuum valve kit, as recited in claim 12, wherein said valve member comprises a valve seat, having a plurality of valve openings spacedly formed thereat, mounted within said air passage, and a flexible valve diaphragm movably supported on said valve seat to move between a sealed position and an unsealed position, wherein at said unsealed position, said valve diaphragm is moved upwardly apart from said valve seat, such that said air is enabled to be sucked out from said sealing cavity through said valve openings within said air passage, and at said sealed position, said valve diaphragm sits on said valve seat to air-seal said valve openings so as to prevent said air returning back to said sealing cavity through said air passage.

* * * * *